May 25, 1937.  P. P-G. HALL  2,081,275
MILLING MACHINE
Filed May 7, 1936   3 Sheets-Sheet 2

WITNESS
F. J. Hartman

INVENTOR
Peter P-G. Hall.
BY George K. Hilbert
ATTORNEY

May 25, 1937.    P. P-G. HALL    2,081,275
MILLING MACHINE
Filed May 7, 1936    3 Sheets-Sheet 3
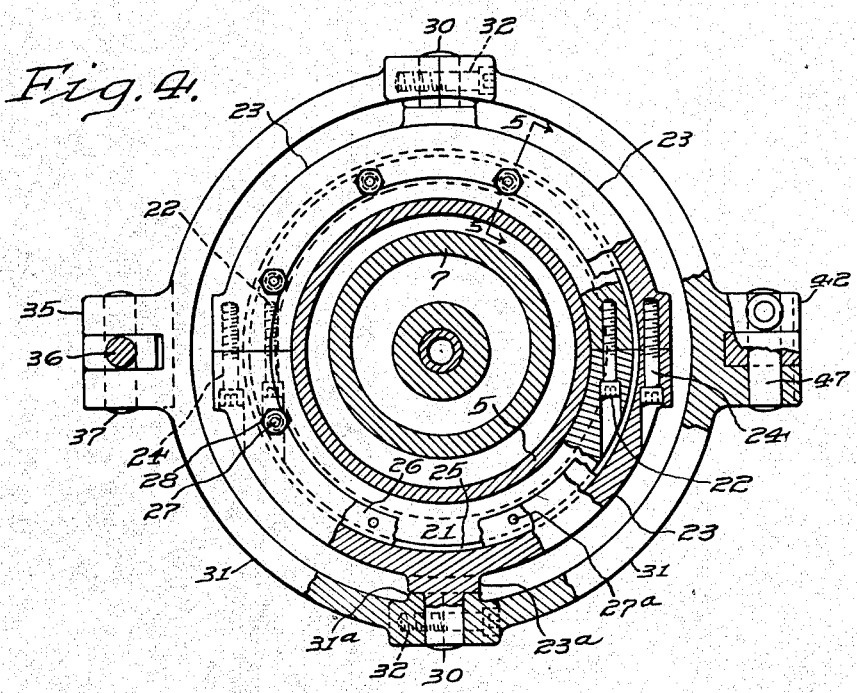
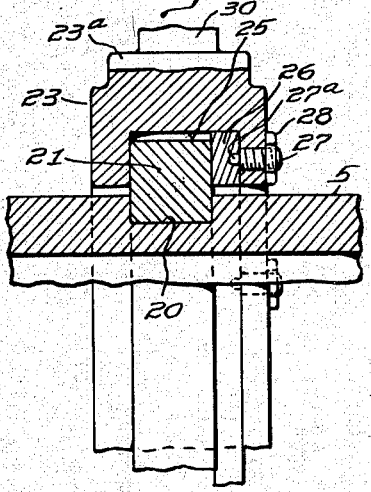
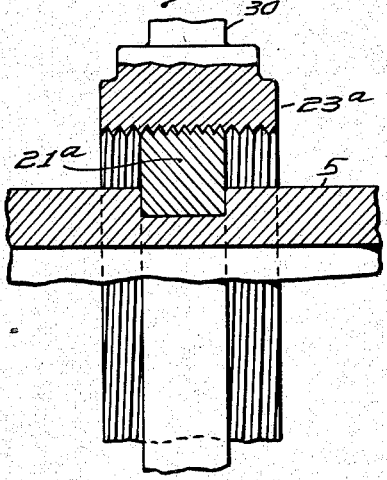
INVENTOR
Peter P-G. Hall.
BY
ATTORNEY
WITNESS
F.J.Hartman.

Patented May 25, 1937

2,081,275

UNITED STATES PATENT OFFICE 2,081,275

MILLING MACHINE

Peter P-G. Hall, Philadelphia, Pa., assignor to The Hall Planetary Company, Philadelphia, Pa., a corporation of Pennsylvania Application May 7, 1936, Serial No. 78,382

11 Claims. (Cl. 10—154)

This invention relates to planetary milling machines of the types generally disclosed in U. S. Letters Patents 1,316,718 and 1,507,235 respectively granted to me September 23, 1919, and September 2, 1924, its principal object being to incorporate improvements in said machine to facilitate their use under certain conditions and/or in machining certain types of work.

Further objects of the invention as well as advantages and novel features of design, construction and arrangement comprehended thereby are hereinafter more particularly pointed out or will be apparent from the following description of a machine constructed in accordance therewith as illustrated in the accompanying drawings.

The said patented machines are adapted for thread and "form" milling, being, for the latter purpose, so arranged that no progressive longitudinal movement is imparted to the cutter while it is operating on the stationarily supported work, but irrespective of whether such movement be imparted to the cutter or not, it must be brought into proper transverse alignment with the work prior to its initial engagement with its inner or outer periphery; in other words, the cutter must be positioned in either exterior or interior overlapping relation with the work prior to commencement of the actual milling operation save in cases in which the end face only of the work is to be machined.

Where but one end of the work is to be milled it can generally be chucked or otherwise held in the requisite overlapping relation to the cutter without much difficulty or loss of time, but where the nature of the work is such that it is preferable to chuck it in a fixed position out of transverse alignment with the cutter and then bring the latter into overlapping relation with it, or where both ends of the work are to be machined simultaneously by the use of two cutters respectively operated by separate milling heads a more difficult problem is presented which hitherto has been capable of solution only by moving the head or heads, as the case may be, in their entirety toward the work after it is chucked and moving them in the opposite direction after the work has been milled so as to clear it from the cutters preparatory to its being unchucked and removed from the machine. As the milling heads even in the smaller sizes are relatively large and of considerable weight, powerful and relatively intricate means are required for moving them, and this practice also involves a considerable loss of time with resulting reduction of productive capacity as they can be moved only relatively slowly, so that not only is the initial cost and subsequent upkeep of the machine as a whole enhanced but the maximum possible return from the capital invested in it is not attained and the cost of operation per piece milled therefore increased.

By the present invention, however, I am able to overcome these difficulties, for in accordance therewith I avoid the necessity of moving the milling head in its entirety when it is desired to move the cutter longitudinally to bring it into proper overlapping relation with the work. The invention thus facilitates the use of a single milling head and cutter for machining certain types of work as well as the use of opposed heads and cutters for simultaneously machining the opposite ends of work disposed between them, since in the former case the work can be chucked in a desired position and the cutter then readily moved up to operative relation therewith and as readily retracted therefrom after the milling is completed, and in the latter both cutters can be retracted outwardly, preferably simultaneously, to allow the work to be inserted between them in a direction transverse to their axis of rotation and there chucked in proper position and the cutters can then be moved up into overlapping relation with the adjacent ends of the work preparatory to being engaged therewith and as readily again retracted to facilitate unchucking and removal of the work after they have operated thereon.

Moreover, the invention may be employed with equal facility in connection with planetary milling machines of the character in question irrespective of whether they are adapted for form milling or for cutting straight or tapered threads as will hereinafter more fully appear.

As the invention is perhaps of greatest utility when employed in connection with a pair of oppositely disposed milling heads associated in operative combination in an organized machine designed to simultaneously form or thread mill opposite ends of a work piece, I have therefore illustrated such a machine embodying the improvements of the present invention in the accompanying drawings in which Fig. 1 is a fragmentary front view of the machine with the milling cutters in retracted position and with certain parts broken away into vertical central section to better illustrate internal construction;

Fig. 4 is a fragmentary transverse section substantially on the line 4—4 in Fig. 2 with certain parts broken away into fragmentary vertical section on a plane lying in rear thereof;

Fig. 5 is a fragmentary detail enlarged section substantially on a line 5—5 in Fig. 4, and Fig. 6 is a similar view showing a modified construction for adapting the machine for cutting threads as distinguished from form milling.

Throughout the drawings like symbols are used to designate the same parts with the addition of a prime (') in the case of those embodied in the right hand milling head shown in Fig. 1.

Figure 1:
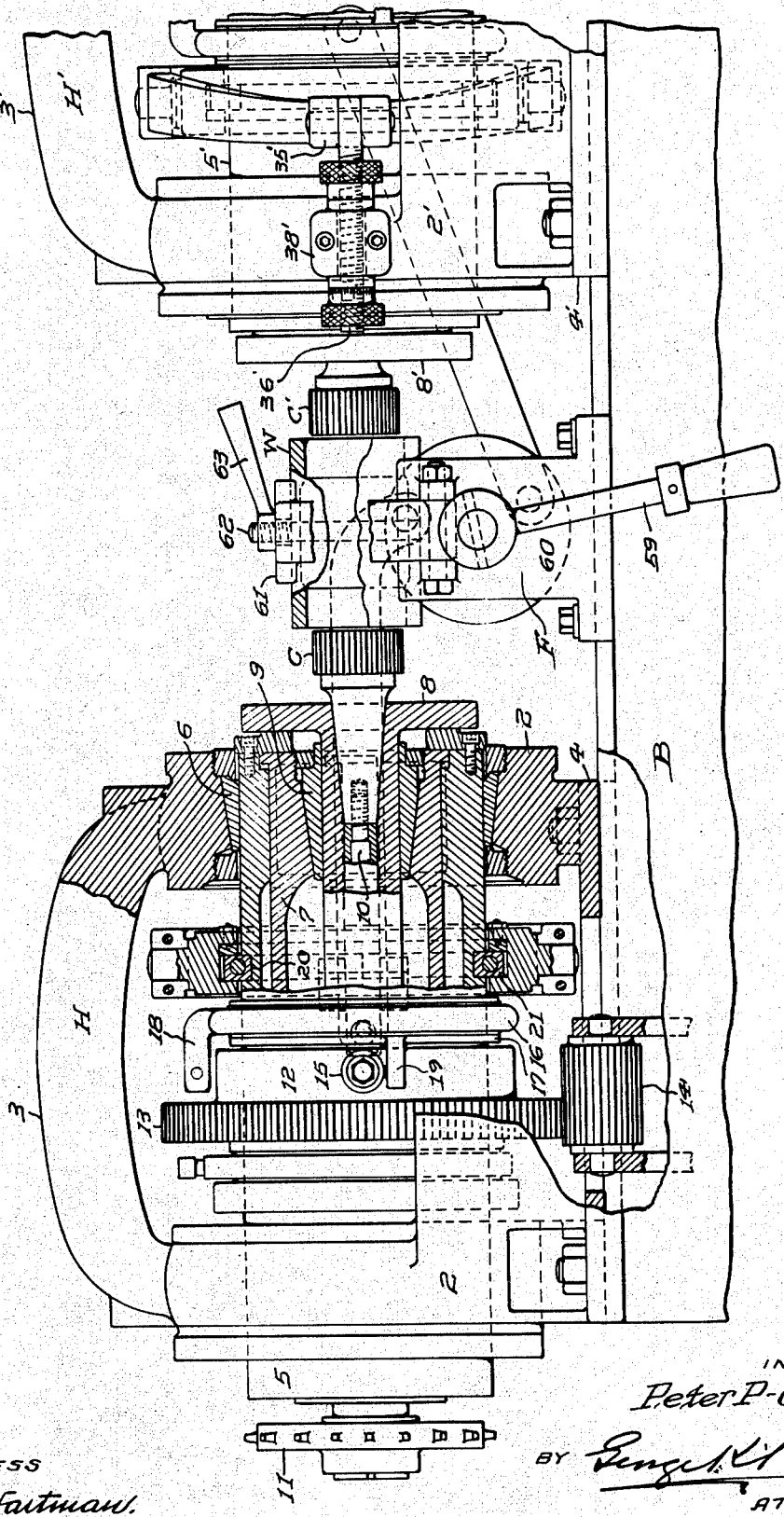

As best shown in said figure the organized machine comprises essentially a suitably supported bed B adjacent the opposite ends of which are mounted the milling heads H, H' and between them a fixture or chuck F suitable for holding the work W in fixed position between the heads, and as this mechanism may be of any type adapted for its intended purpose and will vary materially in its details of construction and operation in accordance with the particular form and character of the work it is designed to hold, I have merely shown a conventional fixture adapted for holding a cylindrical hollow work piece.

As the planetary milling heads embodying the inventions of my said patents are in extended commercial use and well understood by those familiar with the art, detailed reference to their construction and operation would be superfluous herein and I shall therefore describe them only as far as is requisite for a proper understanding of the present invention, while as both heads H, H' are generally similar not only as regards their principal elements but also with respect to the modifications incorporated in them pursuant thereto, a description of one of them, for example the head H, will suffice since it applies equally to head H'.

Thus, head H comprises, among other things, a unitary frame providing cylindrical, horizontally aligned, longitudinally spaced housings 2, 2 tied together by a yoke 3 and rising from a base 4 which rests upon the machine bed B. Extending through the housings is a hollow cylindrical main container 5 rotatably supported on bearings generally designated as 6 which are preferably, as shown, of the split bushing type to enable accurate initial adjustment and subsequent compensation for any wear which may take place as it is necessary for the production of accurate work that all play or lost motion shall be eliminated as far as possible from these bearings. Within and extending from one end to the other of the main container is a hollow secondary container 7 eccentrically mounted for limited rotative movement within the main container and which, in turn, surrounds a longitudinally extending cutter spindle 8 journaled for axial rotation in the secondary container on adjustable bearings generally designated as 9 and preferably of the split bushing type so that any wear or lost motion between the spindle and the secondary container may be readily taken up. The cutter spindle is made hollow and receives at its front end the shank of cutter C, hereinafter more fully described, which may be held in the spindle by a draw bolt 10 extending longitudinally therethrough or in any other suitable way, the spindle being driven by any convenient means, as through the medium of a gear 11 mounted on its rear end carrying a silent chain or the like forming a part of the spindle driving mechanism (not shown), the gear being splined or otherwise arranged on the spindle so that the latter will rotate unitarily with but can slide longitudinally through the gear.

Between the housings the main container is surrounded by a rotatable sleeve 12 suitably prevented from longitudinal movement relatively to the container, and mounted upon and keyed to this sleeve is a gear 13 which meshes with a drive pinion 14 suitably mounted below the gear and in turn driven by a gear train and/or other mechanism (not shown) so as to turn gear 13 and sleeve 12 in either direction when and as required.

A driving stud 15 threaded at its inner end into the secondary container extends outwardly through an arcuate slot in the main container and a hole in sleeve 12 so that as gear 13 is turned in one direction or the other the stud and secondary container 7 are constrained to move with the sleeve through coaction of the driving stud, but as long as the movement of the stud does not exceed the length of the slot in the main container the latter is unaffected and remains stationary. The outwardly projecting end of this stud thus moves with respect to the main container in a path limited by driving and return stops respectively carried by two bands 16, 17 surrounding and adapted for rotative adjustment with respect to the main container, suitable means (not shown) being provided for clamping the bands in any desired position so that the stops, bands and container will form an operatively rigid unit.

Thus when gear 13 is driven in a clockwise direction when head H is viewed from its right hand or front end as shown in Fig. 1, an initial rotative movement will be imparted through the drive stud to secondary container 7 which is operative, through the eccentric mounting of the secondary container in the main container, to cause the cutter to be moved eccentrically toward the work, assuming it is transversely aligned therewith, until the driving stud engages the driving stop 18, the length of the arc through which the stud moves before it contacts the stop being of course determined by the position of rotative adjustment of band 16 supplemented by adjustment of the stop itself if, as is usual, it is made adjustable relatively to the band, and is so gauged that the stud will contact the stop just as the cutter attains full operative depth in the work. Thereafter, through the medium of the stop and stud, the main and secondary containers move unitarily so as to carry the cutter about the work in a planetary orbit and in the same relation thereto, i. e., at the same depth of cut, as that to which it was brought by the partial revolution of the secondary container in the main container before the latter started to revolve.

At the completion of this planetary movement the direction of rotation of gear 13 is reversed, preferably automatically, through the medium of suitable mechanism (not shown), which of course correspondingly reverses the direction of rotation of sleeve 12 so as to move the stud away from stop 18 and toward the return stop 19 which is carried by band 17 and so disposed that the stud will contact therewith prior to its reaching the adjacent end of the slot in the main container. During this reverse or return movement of the stud, the main container remains stationary and the secondary container turns eccentrically within it so as to move the cutter out of engagement with the work, but as soon as contact between the stud and return stop is established, the main and secondary containers thereafter move unitarily in reverse direction desirably for a little more than a full revolution so as to return all the parts to the position they occupied at the initiation of the operative cycle. Where the rotative speed of gear 13 is increased as is desirable after its reversal of direction, a quick return of the parts to initial position is thus effected with corresponding saving of time, but of course if preferred the parts may be returned at the same rate at which they were moved in the earlier part of the cycle.

When a milling head of this general character is used for form milling, a form cutter C of suitable type is employed and no longitudinal or axial movement imparted to it during its engagement with the work, but when a straight thread is to be milled a threading cutter having teeth of profile corresponding to that of the desired thread but without pitch is substituted and means provided for imparting to the cutter a longitudinal movement of progression while it is operating on the work to thereby produce a continuous helical thread therein. Such means usually comprise a master nut surrounding the main container and supported on frame 1 and a master screw cooperative therewith carried by the container, so that as the latter rotates in the frame it is led longitudinally by the coaction of the screw and nut, while when a tapered thread is desired, a tapered threading cutter is utilized and additional means provided for causing a gradual rotation of the secondary container in the main container while the cutter is operating so as to compensate for the difference in radial magnitude of the successive convolutions of the tapered thread, all as more fully explained in my said patents.

In accordance with the present invention, I provide means operable to move the main container and its contained parts longitudinally of the housings in which it is supported independently of any of the movements and mechanisms for accomplishing them to which I have briefly referred together with means, in an organized machine embodying two heads such as that now under consideration, for simultaneously actuating both of the container moving means respectively associated with the heads so as to thereby retract the cutters to allow the work to be moved and chucked between them and to then project them toward it to bring them to operative position with respect thereto.

More particularly and for accomplishing these results in a machine designed for form milling, I provide in the surface of main container 5, conveniently between bands 16, 17 and the adjacent housing 2, a peripheral groove 20 for the reception of a two-part collar 21, the segments of which are secured together and tightly clamped about the container by screws 22 after they are disposed in the groove. This collar is desirably of substantially rectangular section and is surrounded by a two-part actuating ring 23, the segments of which are held together by screws 24, which is provided with an internal groove 25 into which the outer part of collar 21 extends as best shown in Fig. 5, the inner diameter of the actuating ring being somewhat greater than the diameter of the main container so that a clearance is left between these parts. To insure against axial play or lost motion between collar 21 and the actuating ring as well as to afford means for compensating for any wear which may take place between them, I prefer to make groove 25 of sufficient width to enable a gib ring 26 to be fitted between one end face of the collar and the adjacent side of the groove and to arrange a plurality of circumferentially spaced adjusting screws 27 in the adjacent end wall of the actuating ring in such manner that their inner ends will bear on the gib ring and their outer ends project sufficiently beyond the actuating ring to receive lock nuts 28 adapted to keep them from backing out of adjusted position, the screws being desirably provided at their inner ends with short extensions 27a of reduced diameter seating in corresponding holes in the gib ring to thereby prevent the latter from rotating in the actuating ring. Thus by loosening the lock nuts and setting up on screws 27 a very snug adjustment between collar 21 and the actuating ring can be effected either initially or to compensate for wear.

The actuating ring is provided with a pair of diametrically opposed outwardly directed bosses 23a and with oppositely directed aligned trunnions 30 respectively projecting therebeyond, and is so disposed in the assembled machine that these trunnions extend vertically, the plane of separation of the parts of the ring being preferably horizontal but not necessarily so. The trunnions are received in a two-part yoke 31 generally surrounding the actuating ring in spaced relation thereto, the plane of separation of its parts being of course coincident with the axis of the trunnions, and the ends of the ring parts are enlarged to afford proper bearings for the latter and also to form bosses 31a complementary to bosses 23a and respectively seating thereagainst so as to restrain the yoke from vertical movement with respect to the actuating ring, the yoke elements being held together by screws 32 suitably disposed adjacent their ends.

It will thus be apparent that when the several parts hitherto described are assembled, as best shown in Figs. 1 and 4, collar 21 is free to revolve with the main container 5 within the actuating ring 23 but is incapable of axial movement with respect to said ring and that yoke 31 is free to turn relatively to the actuating ring upon trunnions 30 but is in non-rotatable relation with respect thereto, and mechanism now to be described consisting essentially of means forming a vertical pivot for the yoke at one side thereof and means adjacent its opposite side for moving it to and fro about said pivot, is provided for oscillating the yoke horizontally in a general longitudinal direction with respect to the frame of the milling head.

To this end the yoke is provided with an integral outwardly directed jaw 35 extending parallel to its horizontal diameter and thus normal to the trunnions 30 in which is received the enlarged end of an adjusting screw 36, a pin 37 extended through the jaw and screw serving to secure the parts together and forming a pivot about which the yoke can turn with respect to the screw. This screw which is threaded for the major part of its length, passes freely through a horizontal bore in a bracket 38 secured to the adjacent housing 2 and carries on opposite sides thereof adjusting nuts 39 bearing against washers 40 interposed between them and the bracket. Thus by backing off one nut and setting up on the other, pin 37 can be moved longitudinally for a limited distance with respect to the housing and located very accurately at any desired point.

Figure 2:
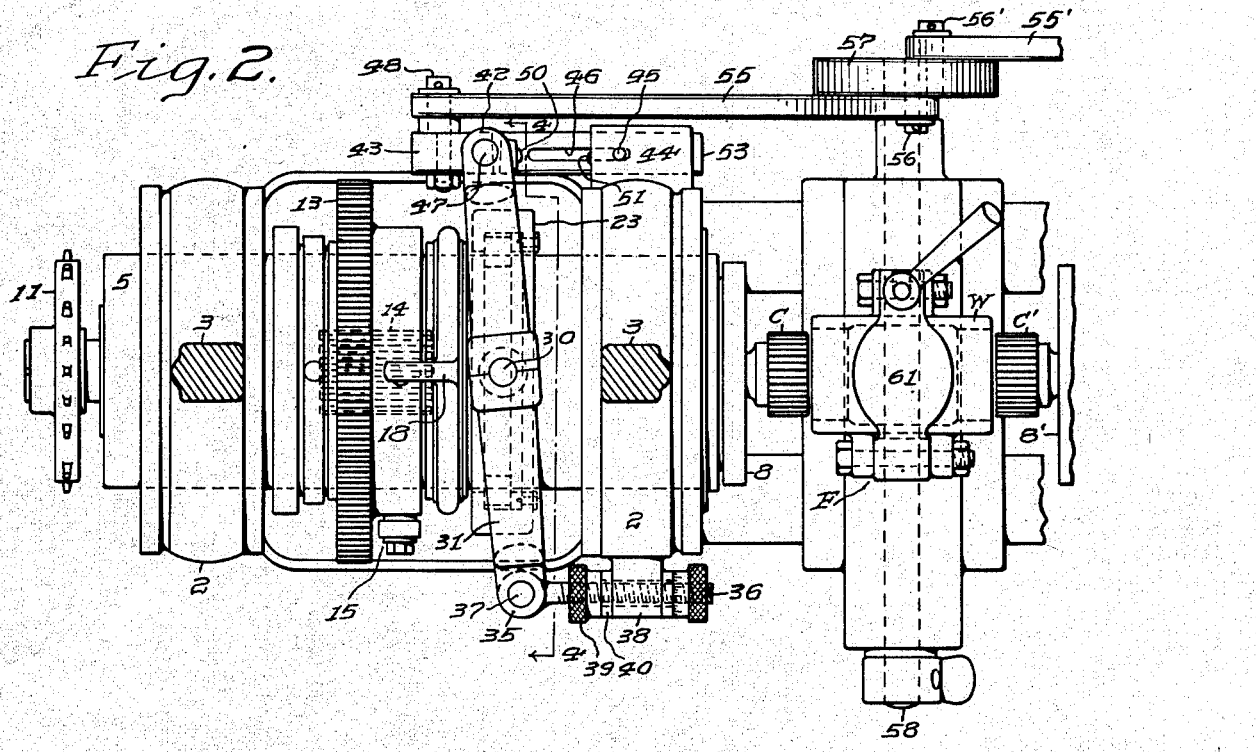
Fig. 2 is a top plan view of the parts lying to the left of the right hand milling head shown in Fig. 1 with the cutters in the same position as in the said figure.
Figure 3:
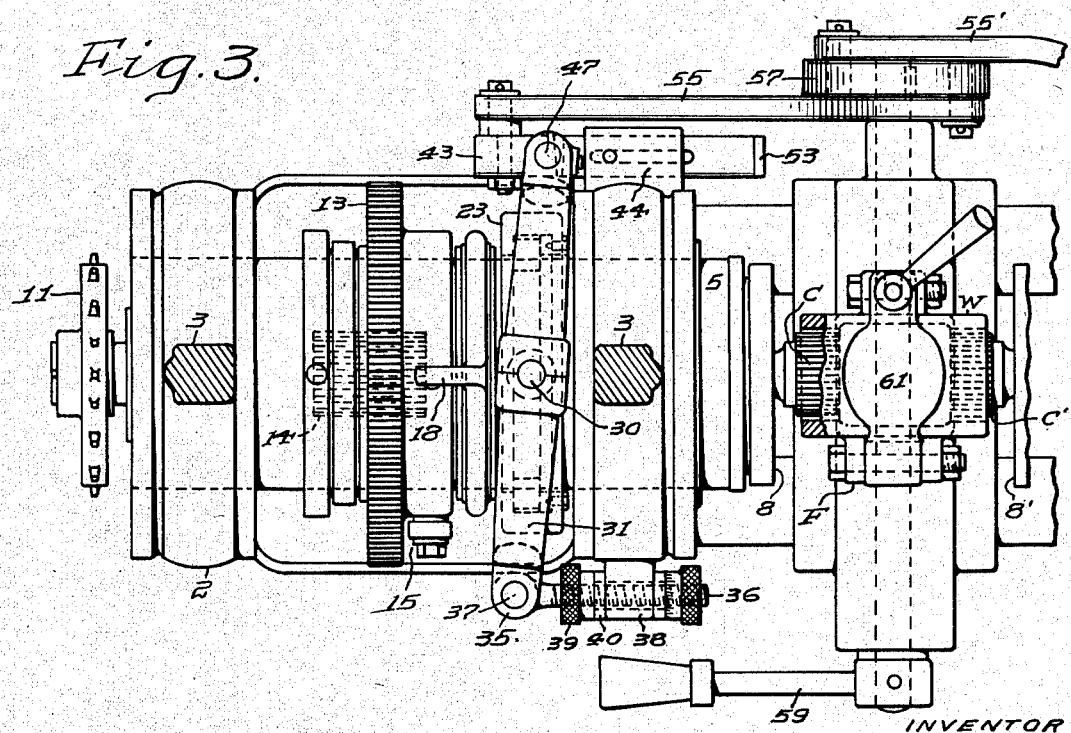
Fig. 3 is a view similar to Fig. 2 with the cutters in projected or operating position.

On its opposite side the yoke is also provided with a jaw 42 generally corresponding to jaw 35 and in horizontal alignment therewith in which is received a slide 43 which extends through a bracket 44 secured to the adjacent side of the housing and which may be either provided with a hole of suitable contour to snugly receive the slide or may, as shown, be of jaw-like contour, that is, devoid of any wall or keeper on the outer side of the slide, in which case some means for holding the slide in the bracket are preferably provided such, for example, as a pin 45 in the upper lug of the bracket projecting into a groove 46 in the upper face of the slide. The yoke and slide are pivotally connected by a vertically extending pin 47 generally corresponding to pin 37 and at its end remote from the bracket the slide is connected in any convenient way, as through the medium of a stud 48, with suitable actuating means, such for example as those hereinafter described, by which it can be moved longitudinally in its supporting bracket to thereby in turn swing the yoke about the pivot formed by pin 37 and thus impart to actuating ring 23, collar 21, main container 5 and parts enclosed therein, a longitudinal or axial movement during which the main container slides in its bearings 6. The extent of this movement in the forward direction, that is, that serving to move cutter C toward the right in Figs. 1–3, is limited by engagement of yoke 31 with bracket 44, hardened pins 50, 51 being respectively seated in these parts to minimize wear in the area of contact, and in the other or reverse direction by any suitable means such as a stop 53 secured to the slide in a position to contact the opposite face of bracket 44. As pins 37 and 47 are preferably equidistantly spaced from the trunnions, it is apparent that the movement imparted to the container under these conditions is equal to one-half the movement imparted to pin 47 and as the possible movement of the latter is limited, as just explained, the adjusted position of pin 37 determines the relative longitudinal position of the path of movement of the container with respect to the frame; thus when pin 37 is located close to bracket 38, the cutter will be further from frame 1 in either fully retracted (Fig. 2) or fully projected (Fig. 3) position than when the pin is located at a greater distance from the bracket.

This ability to regulate the position of the path of movement of the container and cutter with respect to the frame is of great advantage in setting the machine for operation on various types of work, since within the limits afforded by this adjustment it is possible to determine the operating and retracted positions of the cutter with great nicety. Consequently, a machine comprising but a single head can be readily set to operate on shorter or longer work pieces when chucked in the same position with respect to frame 1 by so locating pin 37 that the cutter when in fully projected, i. e., operating, position will properly register with the end of the work, while when it embodies two heads, as shown in Fig. 1, the operative position of both cutters C, C' can be as readily altered in accordance with the length of the work.

Any suitable means may be utilized for moving the stud 48 to actuate slide 43 and when the organized machine comprises two heads oppositely disposed on the same bed, said means may conveniently comprise a pair of links 55, 55' respectively connected at their outer ends to studs 48 and at their inner ends to pins 56, 56' projecting oppositely from a disk 57 on a horizontal shaft 58 extending transversely of the machine bed at a point substantially midway between the respective heads. This shaft may be supported in any suitable way but I prefer to journal it in the base of the work-holding chuck or fixture F which is mounted on the bed and adapted to hold the work stationary between the heads and in axial alignment with the latter. That end of the shaft adjacent the front of the machine may be provided with an operating handle 59 so disposed that it can be conveniently manipulated by the machine operator to turn the shaft and disk 57, in which pins 56, 56' are so located that when the disk is turned in one direction slides 43 of the respective heads are moved oppositely inward and when it is turned in the other direction they are moved oppositely outward so as to correspondingly actuate their respective yokes 31 and thereby move the containers and cutters toward or away from each other. In the particular construction illustrated, the cutters are projected toward each other when handle 59 is swung in a clockwise direction in Fig. 1 and vice versa, but of course the particular direction of movement of the handle is a matter of choice, as well as the particular means, whether manual, mechanical or fluid actuated, utilized to turn disk 57 or equivalent element.

The fixture F which, as hitherto stated, is shown merely in a conventional way, comprises a base 60 secured to the bed of the machine, the upper face of which is hollowed out to receive the lower part of the work W, for example, a short, hollow, cylindrical nipple, sleeve or the like, a strap 61 hinged to the front of the base adapted to seat over the upper part of the work, a bolt 62 hinged to its back engageable in a jaw in the free end of the strip, and a locking handle 63 threaded onto the upper end of the bolt, so that after the strap is passed over the work the bolt can be brought up and engaged in the jaw and the strap then clamped down to hold the work securely in the fixture in a well known way. It will be appreciated, however, that any other type of work supporting means adapted for receiving and holding the particular work which is to be milled may be utilized instead since it forms no part of the present invention.

I shall now briefly refer to the operation of the organized machine shown in Figs. 1–4 assuming its various parts are constructed and assembled substantially as hereinbefore described: Preparatory to the introduction of the work W, operating handle 59 is turned so as to move slides 43 outwardly and correspondingly move the main containers and parts associated therewith, including the cutters, to retracted position (Figs. 1 and 2). A clear path is thereby afforded for moving the work into the fixture in a direction generally transverse to the bed of the machine, for the space between the retracted cutters is greater than the length of the work upon which the machine is intended to operate, as it will be understood that machines of the character to which the invention relates are of the "production" type, that is, initially designed to consecutively perform the same operation upon successive pieces of work with maximum speed and efficiency. Consequently, if the machine is intended to operate upon work pieces six inches long, the length of the bed and position of the milling heads thereon will be determined accordingly, although, as hitherto pointed out, by adjustment of pivots 37 a given machine can be set, within limits, to operate on somewhat shorter or longer work pieces than those for which it is primarily designed.

The handle is now turned in the opposite direction to project the containers and cutters simultaneously toward each other to thereby bring the latter when they reach the limit of their inward travel into proper registry with the work as shown in Fig. 3, gears 13 of course sliding on their relatively elongated driving pinions 14 during the movements of the containers. The driving means for cutter-holding spindles 8 are now set in motion, if not already in operation, and the pinion driving means also started to thereby turn gears 13 so that in accordance with the normal operation of planetary milling heads of the class to which the invention relates and to which brief reference has hitherto been made, the cutters are first moved radially in to depth in the work and then carried about it to perform the desired machining operation thereon, then moved radially outward sufficiently to clear the work and finally returned to their initial position, the spindle-driving means being usually maintained continuously in operation so as to keep the cutters constantly revolving. As soon as the cutters have been thus cleared from the work, handle 59 may be swung in the opposite direction so as to retract them longitudinally therefrom and enable the work to be removed from the fixture and the ensuing piece inserted preparatory to the performance of another operating cycle.

It is thus apparent that in accordance with my invention the cutters of a double-head planetary milling machine can be readily separated sufficiently to enable the work to be chucked between them and then brought up into proper operative registry therewith preparatory to the machining operation they are designed to perform upon it, while it will of course be equally apparent that if the cutters are designed solely to mill faces of the work lying normal to its axis or mill such faces and also its periphery they may, through the medium of the invention, be merely fed longitudinally against said faces for a predetermined distance to thereby machine them or so fed and then allowed to operate on the periphery of the work or vice versa so as to finish both said faces and the periphery in one operation.

I have hitherto referred more particularly to the employment of the invention in a machine designed for form milling and/or face milling in which the cutter is devoid of longitudinal movement while operating on the work or is simply forced against a face thereof but it is equally adapted for employment in a machine designed to mill either external or internal threads upon the work. Under such conditions either a straight or a tapered milling cutter is employed and a longitudinal movement of progression imparted to the cutter while it is operating on the work.

To this end I substitute for the plane collar 21 a collar 21a (Fig. 6) having on its periphery a continuous helical thread of the same pitch as that desired in the work and replace the actuating ring 23 with an actuating ring 23a having internal threads cooperative with those on collar 21a, the threads on the ring preferably extending from one end face thereof to the other. It results that under these conditions rotation of the main container 5 and collar 23a locked thereto is effective to move these parts longitudinally relatively to the ring at a rate determined by the pitch of the threads therein since the ring remains in a fixed position with respect to frame 1 while the cutter is in operation; the latter is thus given a similar progressive longitudinal movement with respect to the work and consequently produces therein a helical thread of corresponding pitch to that of the aforesaid threads and in profile to the teeth of the cutter. In the production of a straight thread in this manner no relative movement between the main and secondary containers takes place while the cutter is operating on the work, but if a tapered thread is desired, means are brought into play to slowly turn the secondary container in the main container during the milling operation so as to move the cutter gradually to or from the work in a generally radial direction to compensate for the difference in radial magnitude of the thread segments, all as more fully explained in my said Patent 1,507,235.

While I have herein more particularly described and illustrated my invention as embodied in a milling machine comprising two oppositely disposed planetary milling heads arranged to operate simultaneously on a piece of work supported between them, it will be understood that I do not thereby desire or intend to confine its employment to a machine of that type as it may be applied with equal facility to a machine having but a single milling head with respect to which the work is chucked in a fixed position, while the precise details of design, construction and arrangement of the various elements utilized in attaining the objects of the invention are capable of variation and modification in many particulars within the spirit and scope of the appended claims.

Having thus described my invention, I claim and desire to protect by Letters Patent of the United States:

1. A milling machine comprising a frame, a main container journaled therein, a secondary container eccentrically journaled in the main container, a cutter spindle journaled in the secondary container and a cutter carried by the spindle, main container translating means including an actuating ring surrounding the main container and interconnected therewith, a yoke engaging the ring, pivots carried by the yoke at diametrically opposed points, means connecting one of the pivots with the frame, means interconnected with the other pivot for moving the yoke about the first pivot to thereby translate the main container and parts carried therein longitudinally to bring the cutter to predetermined transverse alignment with a work piece fixed in spaced relation to the frame, means for thereafter turning the secondary container in the main container to move the cutter transversely to depth in the work piece, means for then rotating the main container to carry the cutter about the work piece in a planetary orbit, and means independent of said translating means for determining the position of the cutter with respect to the work piece during its said orbital movement.

2. A milling machine comprising a frame, a main container journaled therein, a secondary container eccentrically journaled in the main container, a cutter spindle journaled in the secondary container and a cutter carried by the spindle, main container translating means including a collar secured to the main container, a non-rotatable actuating ring surrounding the collar, a yoke pivoted to the ring and having a pivotal connection with the frame, a slide carried by the frame and pivoted to the yoke at a point diametrically opposite said pivotal connection, means for moving the slide to thereby move the yoke about said pivotal connection to effect axial translation of the actuating ring and main container relatively to the frame to bring the cutter to predetermined transverse alignment with a work piece fixed in spaced relation thereto, means for thereafter turning the secondary container in the main container to move the cutter transversely to depth in the work piece, means for rotating the main container to carry the cutter about the work piece in a planetary orbit, and means independent of said translating means for controlling the position of the cutter with respect to the work piece during its said orbital movement.

3. A milling machine comprising a frame, a main container journaled therein, cutter supporting means carried by the container, a cutter carried by said means, main container translating means including a collar secured to and surrounding the container, an actuating ring engaging the collar, a yoke surrounding the ring, pivots extending between the yoke and ring at diametrically opposed points, means pivotally connecting the yoke to the frame adjacent one end of a diameter normal to the axis of the pivots, actuating means for the yoke pivoted thereto adjacent the other end of said diameter operable to shift the container axially to bring the cutter to or retract it from predetermined transverse alignment with a work piece fixed in spaced relation to the frame, means for moving the cutter transversely to depth in the work piece after it is shifted to said alignment, means for then rotating the main container to carry the cutter about the work piece in a planetary orbit, and means for determining the axially adjusted position of the cutter with respect to the work piece during its said orbital movement.

4. In a milling machine of the class described, a frame, a main container journaled therein, means for rotating the container, cutter supporting means carried by the container, a cutter carried by said means, means surrounding and interconnected with the container pivotally movable relatively to the frame to thereby shift the container axially in opposite directions along a predetermined path to thereby bring the cutter to and retract it from predetermined transversely aligned position with a work piece fixed in spaced relation to the frame, means for varying the location of said movable means with respect to the frame to thereby alter the position of said path relatively thereto and correspondingly alter the said aligned position of the cutter with the work piece, means for moving the cutter transversely from said position to bring it to depth in the work piece, means for then rotating the main container to carry the cutter about the work piece in a planetary orbit, and means for determining the longitudinal alignment of the cutter with respect to the work piece during its said orbital movement.

5. In a milling machine comprising a frame, a main container journaled therein, a secondary container eccentrically journaled in the main container and a cutter spindle journaled in the secondary container, an externally threaded collar secured to the main container, an internally threaded ring surounding the collar and cooperative therewith, and means for moving the ring axially of the frame to thereby correspondingly shift said container therein.

6. In a milling machine comprising a frame, a main container journaled therein for rotative and axial movement, a secondary container eccentrically journaled in the main container and a cutter spindle journaled in the secondary container, an externally threaded collar secured to the main container, an internally threaded actuating ring surrounding and cooperating with the collar and means for moving the ring axially to thereby correspondingly shift the main container in the frame through the engagement of the threads in the ring with those on the collar, said threads being operative to impart progressive axial movement to said container when rotated irrespective of the position of the ring within its limits of movement.

7. In a milling machine comprising a frame, a main container journaled therein, a secondary container eccentrically journaled in the main container and a cutter carrying spindle journaled in the secondary container, an externally threaded collar secured to the main container, an actuating ring surrounding and having internal threads cooperative with the threads on the collar, a yoke pivoted to the ring and having a pivotal connection with the frame and means engaging the yoke at a point diametrically opposed to said connection operable to swing the yoke thereabout and thereby move the ring and main container axially with respect to the frame.

8. A milling machine of the class described comprising a bed, a pair of planetary milling heads oppositely disposed thereon, each head comprising a frame, a main container journaled therein and a cutter carrying spindle rotatably supported within the container, means including a movable yoke pivoted to each frame operable to move the adjacent container axially in its frame, and means interconnecting said yokes operable to simultaneously swing them in opposite directions to thereby cause the containers to approach or recede from each other.

9. A milling machine of the class described comprising a bed, a pair of planetary milling heads oppositely disposed thereon, each head comprising a frame, a main container journaled therein and a cutter carrying spindle rotatably supported within the container, a yoke pivotally interconnected with each container and pivoted to the adjacent frame and means interconnecting the yokes diametrically opposite their respective pivotal connections to the frames operable to swing the yokes simultaneously in opposite directions to thereby move the containers axially in corresponding directions in the frames.

10. In a milling machine of the class described, a pair of opposed axially movable rotatable main containers, a frame supporting each container, a yoke pivotally connected to each frame and surrounding the adjacent container, an internally threaded actuating ring pivoted to each yoke, a threaded collar carried by each container cooperative with the threads of the adjacent ring, a longitudinally movable slide pivoted to each yoke at a point diametrically opposed to the pivotal connection thereof with its frame and means extending between the slides operable to effect their simultaneous movement in opposite directions to thereby move the containers axially in corresponding directions in the frames.

11. In a milling machine comprising a frame, a main container journaled therein, a secondary container eccentrically journaled in the main container and a cutter spindle journaled in the secondary container, threads associated with the main container, a threaded element cooperative therewith and means for moving the element axially of the frame to thereby correspondingly shift said container therein through the mutual engagement of the threads.

PETER P-G. HALL.